United States Patent [19]

Caires et al.

[11] Patent Number: 5,762,161

[45] Date of Patent: Jun. 9, 1998

[54] MOTOR VEHICLE

[76] Inventors: Richard Caires, 12 Kingdom Ridge Rd., Bedford, N.Y. 10506; Douglas Caires, 4148 Bedford Ave., Brooklyn, N.Y. 11229

[21] Appl. No.: 379,343

[22] Filed: Jan. 27, 1995

[51] Int. Cl.$^6$ .................................................. B60K 1/00
[52] U.S. Cl. ................................ 180/165; 180/65.3
[58] Field of Search .................... 180/165, 65.1, 180/65.2, 65.3, 65.4; 74/675, 686; 290/46, 16

[56] References Cited

U.S. PATENT DOCUMENTS

| | | | |
|---|---|---|---|
| 3,732,751 | 5/1973 | Berman et al. | 74/675 |
| 4,407,398 | 10/1983 | Fiala | 180/165 |
| 4,423,794 | 1/1984 | Beck | 180/165 |
| 4,495,451 | 1/1985 | Barnard | 180/165 |
| 4,588,040 | 5/1986 | Albright, Jr. et al. | 180/165 |
| 5,285,111 | 2/1994 | Sherman | 180/65.2 |
| 5,323,868 | 6/1994 | Kawashima | 180/165 |

FOREIGN PATENT DOCUMENTS 4118678  12/1992  Germany ........................ 180/165

*Primary Examiner*—Richard M. Camby
*Attorney, Agent, or Firm*—Michael J. Striker

[57] ABSTRACT

A motor vehicle comprises ground engaging means and driving means for driving the ground engaging means and including a rotatable drive shaft, the drive shaft being provided with means for generating electric current.

6 Claims, 1 Drawing Sheet

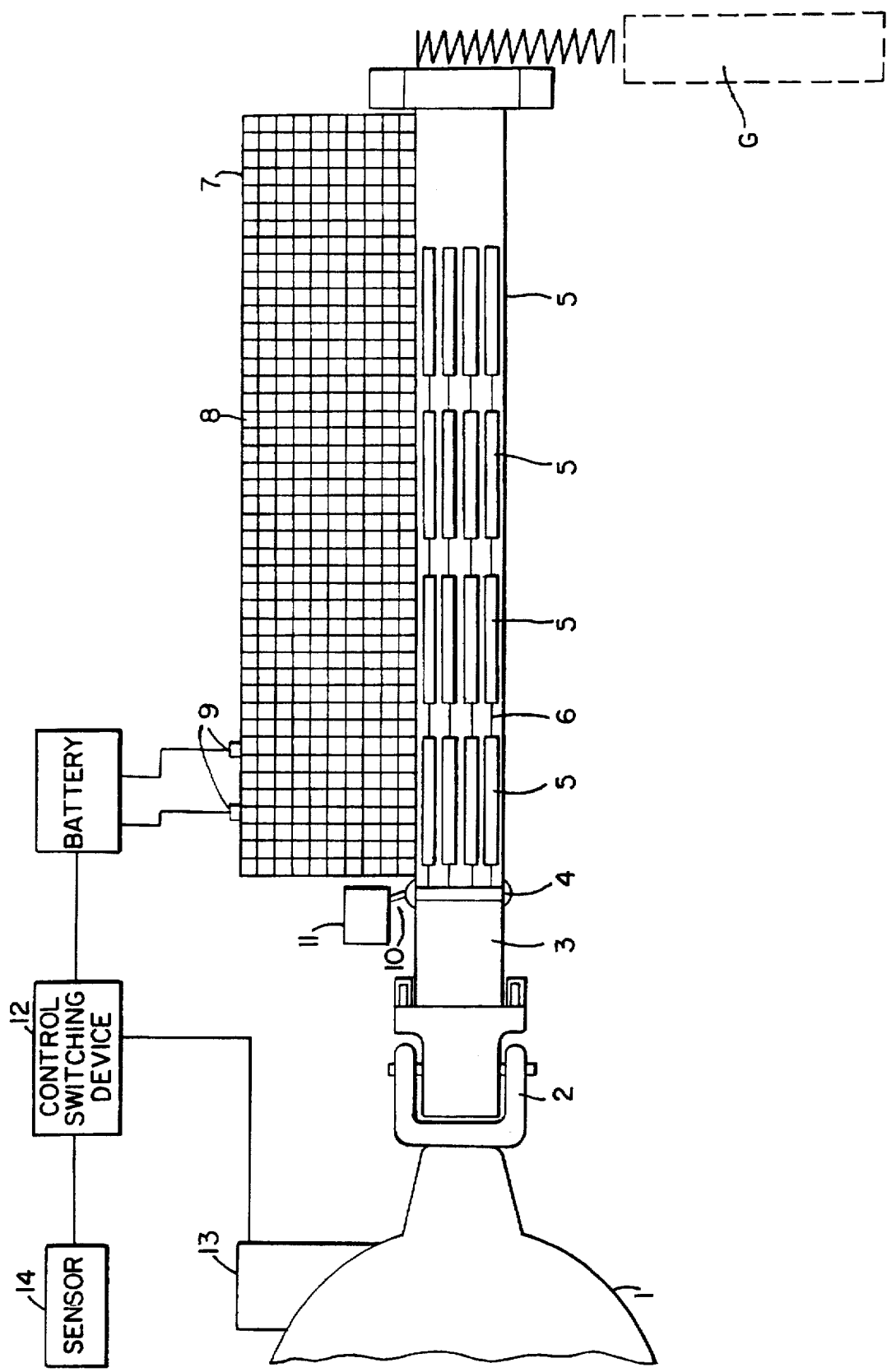

MOTOR VEHICLE

BACKGROUND OF THE INVENTION

The present invention relates generally to motor vehicles.

It is known that motor vehicles are provided with electric batteries for supplying electric current either as an auxiliary energy source for example in motor vehicles driven by internal combustion engines, etc. or as a main energy for example for electrically operated motor vehicles. Conventionally the electric batteries are charged from separate, special devices arranged in the motor vehicle or outside the same, which naturally makes the construction of the respective motor vehicles more complicated and/or requires frequent recharging of the battery. It is believed that motor vehicles can be improved in the above specified sense.

SUMMARY OF THE INVENTION

Accordingly, it is an object of the present invention to provide a motor vehicle which avoids the disadvantages of the prior art.

More particularly, it is the object of the present invention to provide a motor vehicle in which a driving shaft of the motor vehicle power train can simultaneously perform two functions namely a first function of transmitting a rotary movement and a second function of generating electricity to be supplied to the battery.

In keeping with these objects and with others which will become apparent hereinafter, one feature of the present invention resides, briefly stated, in a motor vehicle, comprising ground engaging means, and driving means for driving the ground engaging means and including a rotatable drive shaft, the drive shaft being provided with means for generating electric current.

In accordance with another feature of the present invention, the motor vehicle has a shaft member, the means for generating electric current including at least one magnet arranged on the shaft member and forming a rotor, and also a stator relative to which the shaft and therefore the rotor rotates so as to generate the electric current.

In accordance with still another feature of the present invention, the rotor includes a plurality of strips which are distributed over a circumference of the shaft member. The rotor also includes a plurality of groups of magnets arranged so that the groups of magnets are spaced from one another in an axial direction of the shaft member, while the magnets in each of the groups are spaced from one another in a circumferential direction of the shaft member.

In accordance with a further feature of the present invention, the motor vehicle has means for sensing if the motor vehicle is coasting or braking, and control means for supplying electric current to the magnets so that the magnets become electromagnets upon sensing the coasting or braking of the motor vehicle by the sensor.

In accordance with an additional feature of the present invention, the motor vehicle has means for sensing braking of the motor vehicle, the control means being formed so as to supply the electric current to the magnets when the motor vehicle is either coasting and braking, or both.

In accordance with still another feature of the present invention, the motor vehicle has an electrical battery, the means generating electric current supply being connected with the electrical battery so as to charge the electrical battery.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a motor vehicle in accordance with the present invention.

DESCRIPTION OF THE PREFERRED EMBODIMENTS

A motor vehicle in accordance with the present invention has ground engaging means which are identified as 0 and can be formed for example as wheels. The motor vehicle is further provided with drive means which for example for an internal combustion engine-powered motor vehicle includes for example a not shown internal combustion engine, a transmission 1 with a drive shaft 3, and a battery B. For an electrically powered vehicle, the drive can include the transmission 1, the drive shaft 3, and the battery B. In the internal combustion engine-powered vehicle the battery B provides auxiliary energy, in particular electric current for electrically powered devices of the motor vehicle, while in the electrically operated car the battery provides the main power for driving the wheels.

As can be seen from the drawings, the drive shaft 3 is connected with a transmission 1 for example by a universal joint 2. The drive shaft 3, as well known in the field of the motor vehicles, is usually utilized as a purely mechanical shaft for transmitting a rotary movement. The drive shaft 3 in accordance with the present invention also is used for the same purpose and transmits a rotary movement from the transmission. In accordance with the present invention the drive shaft 3 is provided with means for generating electric current. In particular, a plurality of magnets 5 are arranged on the drive shaft or in corresponding depressions of the drive shaft. As shown in the drawings, the magnets are assembled in corresponding groups. The groups of the magnets are spaced from one another in an axial direction of the drive shaft 3, while the magnets in each group are spaced from one another in a circumferential direction of the shaft. The magnets are connected with one another by electrical wire connectors 6. The motor vehicle is further provided with a stator 7 which can be provided with a plurality of windings 8, as well known in electrical generators. The stator 7 and the shaft 3 can be connected with one another to avoid relative displacements. The stator 7 has electrical contacts 9 connectable with the battery B.

In operation, during driving of the motor vehicle in accordance with the present invention, the transmission 1 imparts rotary movement to the shaft 3. During rotation of the shaft 3, together with the magnets 5 relative to the windings 8 of the stator 7, electrical current is produced and supplied through the electrical contacts 9 to the battery B.

The magnets 5 can be formed as permanent magnets. However, in accordance with a further embodiment of the present invention they can be formed as electromagnets which has to be magnetized by an additional electric current supply. For this purpose an electrically conductive band 4 is mounted on the drive shaft 3 so as to be electrically insulated from the shaft for example through an intermediate electrically non-conductive layer and electrically connected with the magnets 5. A sliding current transmitting brush 10 is arranged in contact with the band 4 and accommodated in a module 11. The module 11 is electrically connected with a control switching device 12. The motor vehicle is further provided with a sensor 13 which is attached to the transmission 1 and senses if the motor vehicle is coasting, or in other words senses when no driving power is applied to the ground engaging means 0 but instead the vehicle moves under the action of inertia, gravity forces, etc. The coasting takes place when for example in the internal combustion engine-powered vehicle a driver releases a gas pedal. The motor vehicle is provided further with a sensor 14 which senses when brakes of the motor vehicle are applied.

When the sensor 13 and/or the sensor 14 indicate that the coasting and/or braking take place, the control device 12 and supplies electric current to the module 11 which supplies electric current so as to energize the electromagnets 5. As a result, the electric current will be generated due to the cooperation between the electric magnets 5 of the shaft 3 and the windings 8 of the stator 7 during the periods of the vehicle coasting and/or braking. In all cases, the generation of the electrical energy in the motor vehicle in accordance with the present invention will take place only when the drive shaft has some level of the rotary speed in order to generate the electric current and supply it to the battery.

It will be understood that each of the elements described above, or two or more together, may also find a useful application in other types of constructions differing from the types described above.

While the invention has been illustrated and described as embodied in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A motor vehicle, comprising ground engaging means; and driving means for driving said ground engaging means and including a rotatable drive shaft, said drive shaft being provided with means for generating electric current, said shaft having a shaft member, said means for generating electric current including at least one magnet arranged on said shaft member and forming a rotor, and also a stator relative to which said shaft and therefore said rotor rotates so as to generate the electric current, said rotor including a plurality of strips which are distributed over a circumference of said shaft member.

2. A motor vehicle as defined in claim 1; and further comprising means for sensing if the motor vehicle is coasting; and control means for supplying electric current to said magnets so that said magnets become electromagnets upon sensing the coasting of the motor vehicle by said sensor.

3. A motor vehicle as defined in claim 1; and further comprising means for sensing if the motor vehicle is braking; and control means for supplying electric current to said magnets so that said magnets become electromagnets upon sensing the braking of the motor vehicle by said sensor.

4. A motor vehicle as defined in claim 2; and further comprising means for sensing braking of the motor vehicle, said control means being formed so as to supply the electric current to said magnets when the motor vehicle is either coasting and braking, or both.

5. A motor vehicle as defined in claim 1; and further comprising an electrical battery, said means generating electric current supply being connected with said electrical battery so as to charge said electrical battery.

6. A motor vehicle, comprising ground engaging means; and driving means for driving said ground engaging means and including a rotatable drive shaft, said drive shaft being provided with means for generating electric current, said shaft having a shaft member, said means for generating electric current including at least one magnet arranged on said shaft member and forming a rotor, and also a stator relative to which said shaft and therefore said rotor rotates so as to generate the electric current, said rotor including a plurality of groups of magnets arranged so that said groups of magnets are spaced from one another in an axial direction of said shaft member, while said magnets in each of said groups are spaced from one another in a circumferential direction of said shaft member.

* * * * *